United States Patent
Iyer

(10) Patent No.: US 8,291,385 B2
(45) Date of Patent: *Oct. 16, 2012

(54) METHOD AND SYSTEM FOR TESTING A SOFTWARE PROGRAM

(75) Inventor: Sriram V. Iyer, Santa Clara, CA (US)

(73) Assignee: Broadcom Corporation, Irvine ( * ) Notice: Subject to any disclaimer, the term of this patent is extended or adjusted under 35 U.S.C. 154(b) by 131 days.

This patent is subject to a terminal disclaimer.

(21) Appl. No.: 12/917,414

(22) Filed: Nov. 1, 2010

(65) Prior Publication Data

US 2011/0047530 A1    Feb. 24, 2011

Related U.S. Application Data

(63) Continuation of application No. 11/506,102, filed on Aug. 17, 2006, now Pat. No. 7,827,530.

(51) Int. Cl.
*G06F 9/44* (2006.01)
(52) U.S. Cl. .................................................. 717/124
(58) Field of Classification Search .......... 717/106, 717/111, 124
See application file for complete search history.

(56) References Cited

U.S. PATENT DOCUMENTS

| | | | |
|---|---|---|---|
| 2002/0072830 A1* | 6/2002 | Hunt | 701/1 |
| 2005/0183094 A1* | 8/2005 | Hunt | 719/315 |
| 2005/0289125 A1* | 12/2005 | Liu et al. | 707/3 |
| 2006/0075387 A1* | 4/2006 | Martin et al. | 717/124 |
| 2006/0242115 A1* | 10/2006 | Baras et al. | 707/2 |
| 2007/0104130 A1* | 5/2007 | Venkatachalam | 370/329 |
| 2007/0115951 A1* | 5/2007 | Karaoguz et al. | 370/356 |

* cited by examiner

*Primary Examiner* — Anna Deng
(74) *Attorney, Agent, or Firm* — Sterne, Kessler, Goldstein & Fox P.L.L.C.

(57) ABSTRACT

Methods and systems for testing a software program are provided. The methods include receiving a textual input for testing at least one static type used by the software program. The textual input of an embodiment is pre-linked to the at least one static type. The method includes creating a dynamic type based on the textual input in a dynamically typed language. The dynamic type is populated based on a predefined set of test vectors and is then passed on to the software program. The software program is executed using the dynamic type. Executing the software program by using the dynamic type invokes the at least one static type used by the software program.

19 Claims, 3 Drawing Sheets

METHOD AND SYSTEM FOR TESTING A SOFTWARE PROGRAM

BACKGROUND OF THE INVENTION

The invention generally relates to testing software programs. More specifically, the invention relates to methods and systems for testing a software program using a language that supports dynamic typing.

The software program generally supports one or more types (data types). A type contains a set of values and some operations that may be performed on the set of values. Examples of the types may include, but are not limited to, char, signed char, unsigned char, int, long, double, float, struct, and union. To test the software program, types used by the software program are tested. In addition to testing the types, algorithms used by the software program, correctiveness of the software program and ability of the software program to complete within a deadline are also tested. A software program is tested using a test tool.

In commercial third party testing tools, a test tool used for testing the software program may not be able to communicate directly with the software program. Therefore, for testing each type used by the software program an adaptation layer has to be created. The adaptation layer is created manually to enable compatibility and communication between the test tool and the software program. Additionally, conventional systems of testing are used for protocol programs, like, for example, the 802.11 protocol program.

There is therefore a need for methods and systems for testing a software program that does not require creating an adaptation layer for each type used by the software program. Further, there is a need for methods and systems for testing protocol programs, like, for example, 802.16 protocol software programs.

SUMMARY

An embodiment provides a method and system of testing a software program that does not require an adaptation layer.

An embodiment provides a method and system for testing 802.16 protocol software programs.

Embodiments described below include methods and systems for testing a software program. The method of an embodiment includes receiving a textual input for testing at least one type used by the software program. The textual input is pre-linked to the at least one static type. The method includes creating a dynamic type based on the textual input in a dynamically typed language. The dynamic type is then populated with a predefined set of test vectors and is passed on to the software program. Thereafter, the software program is executed by using the dynamic type. The at least one static type is invoked when the software program is executed using the dynamic type.

BRIEF DESCRIPTION OF DRAWINGS

A more complete appreciation of the present invention is provided by reference to the following detailed description when considered in conjunction with the accompanying drawings in which reference symbols indicate the same or similar components, wherein.

DETAILED DESCRIPTION OF DRAWINGS

Various embodiments described below provide methods and systems of testing a software program using a dynamically typed language. To test a software program, types in the software program are tested and the constraints for each type are applied. In addition to testing types in the software program, algorithms used in the software program may also be tested. Types that are created before compilation are called static types and the types that are created during the runtime are called dynamic types. The static types are created in statically typed languages. Examples of the statically typed language may include, but are not limited to, C, C++, Java, ML and Haskell. The dynamic types are created in dynamically typed languages. Examples of the dynamically typed language may include, but are not limited to, Python, Ruby, Smalltalk, Perl, and Lisp. Methods of testing a software program using a dynamically typed language in accordance with various embodiments are explained hereinafter.

Figure 1:
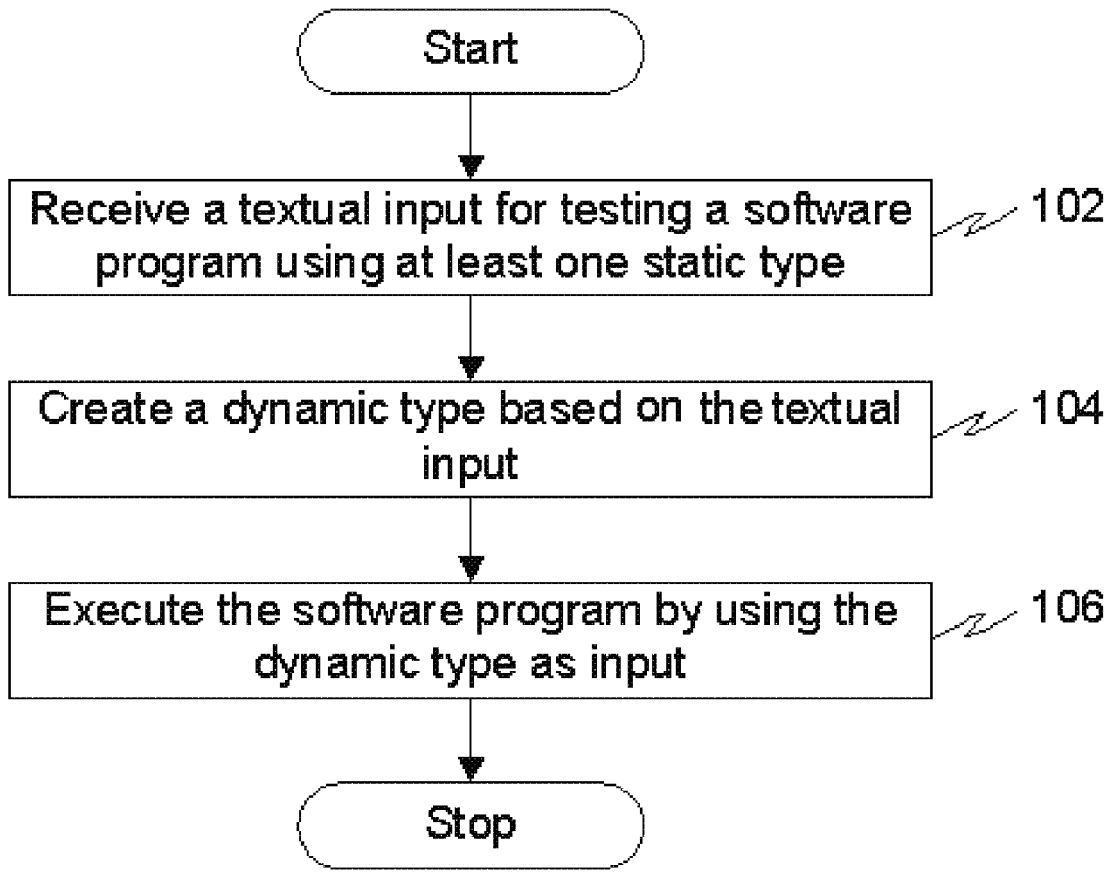
FIG. 1 is a flowchart for testing a software program, in accordance with an embodiment.

FIG. 1 is a flowchart for testing a software program, in accordance with an embodiment. The software program is written in a statically typed language. Therefore, the software program uses one or more static types. The software program may be a protocol software program. A protocol software program enables a standard format for data exchange between data processing systems in a communication network. The standard format, for example, may include a predetermined format for error checking, and a method used for compression of data. In an embodiment, the protocol software program is an 802.16 protocol software program, but the embodiment is not so limited.

At 102, a textual input is received for testing the software program using one or more static types. The textual input is received in a dynamically type language. The textual input is pre-linked to one or more static types, such that a static type can be invoked by using a corresponding textual input. The textual input is pre-linked to a static type through an import definition of the static type. This is further explained below in conjunction with FIG. 2.

At 104, a dynamic type is created based on the textual input in the dynamically typed language. The dynamic type language may be a scripting language. Examples of the scripting language may include, but are not limited to, ColdFusion, Hypertext Preprocessor (PHP), Pike, Python, Ruby and scheme. As a result of the creation of the dynamic type based on the textual input, corresponding static type can be directly accessed from the dynamically typed language. The dynamic type is then populated with a predefined set of test vectors and is passed on to the software program.

At 106, the software program is executed using the dynamic type as input. As the dynamic type is created based on the textual input that is pre-linked to a static type, therefore, the static type is invoked when the software program is executed using the dynamic type. The invoking of the static type enables it's testing. As a result, one or more static types are tested without creating an adaptation layer.

As an example of the method described above, a software program is tested by using Python as the dynamically typed language. The software program includes two static types, i.e., static type 'T1' and static type 'T2'. To test these static types a textual input is received in Python. In this example, the textual input is:

TypeToTest='T1';

This textual input is pre-linked to the static type T1 through an import definition of the static type T1, such that this textual input can be used to invoke the static type T1. Further, a dynamic type P is created based on the textual input in the dynamic type language. The dynamic type P is:

$$P=eval(TypeToTest)(\ )$$

Thereafter, the dynamic type P is populated with a predefined set of test vectors and passed on to the software program. The software program is then executed using the dynamic type P. Thereafter, the static type T1 is invoked when the software program is executed.

Figure 2:
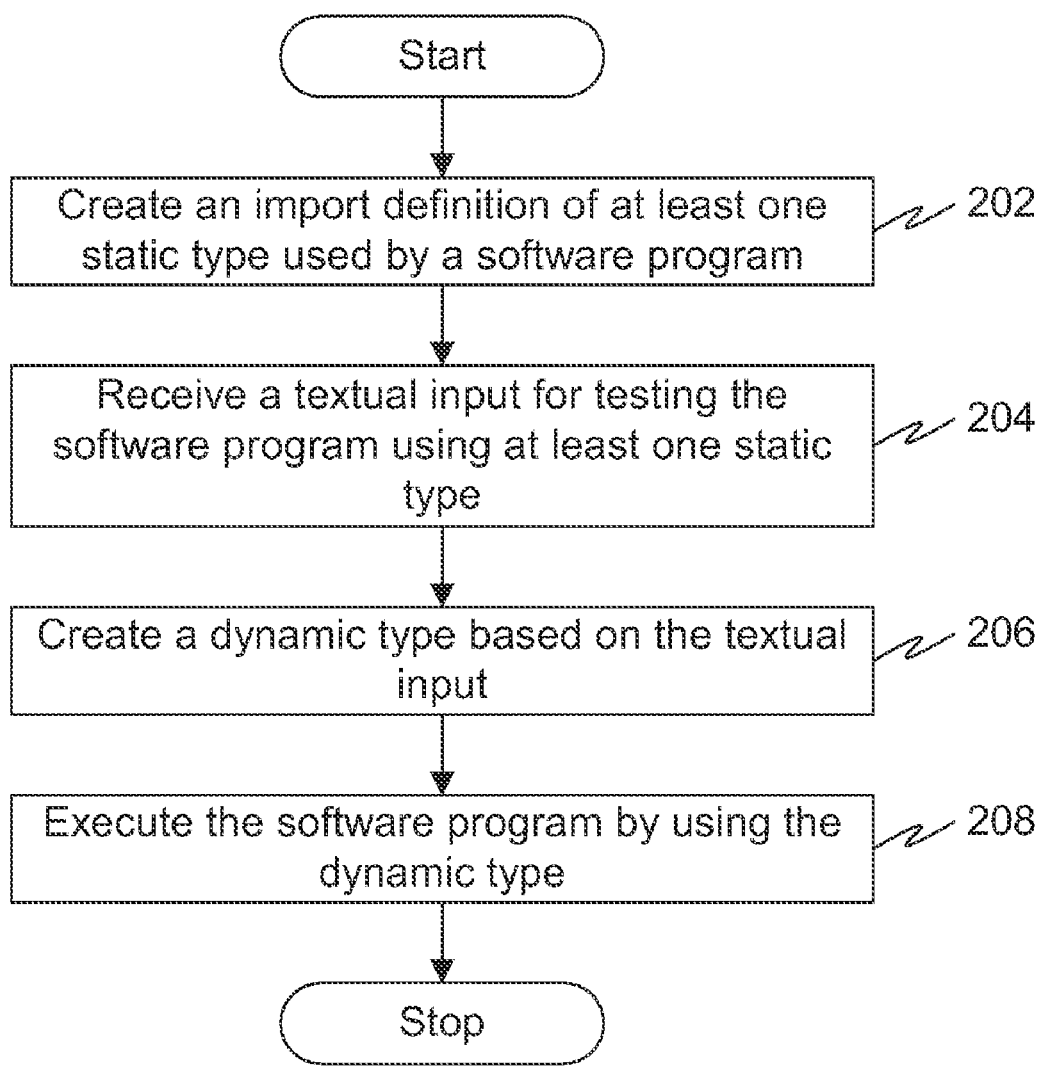
FIG. 2 is a flowchart for testing a software program, in accordance with another embodiment.

FIG. 2 is a flowchart for testing a software program, in accordance with another embodiment. At 202, an import definition of one or more static types used by the software program is created. The import definition of an embodiment is created in the dynamically typed language. The import definition created on the dynamic type language provides a reference/pointer to the at least one static type. The import definition is pre-linked to a textual input by predefining textual input for the import definition in the system. The import definition is created by a Simplified Wrapper and Interface Generator (SWIG). The SWIG creates bindings (import definitions) on a scripting language from a software program written in static typed languages. These bindings can then be used from the scripting language to use the software program written in static typed languages. At 204, a textual input is received. As the textual input is pre-linked to the import definition, it can be used to access one or more static type through the import definition.

Further, a dynamic type is created based on the textual input at 206. At 208, the software program is executed using the dynamic type. The dynamic type is created based on the textual input that is pre-linked to the import definition. Further, the import definition provides a reference or pointer to the at least one static type. Therefore, executing the software program by using the dynamic type invokes one or more static types and enables testing of one or more static types.

Figure 3:
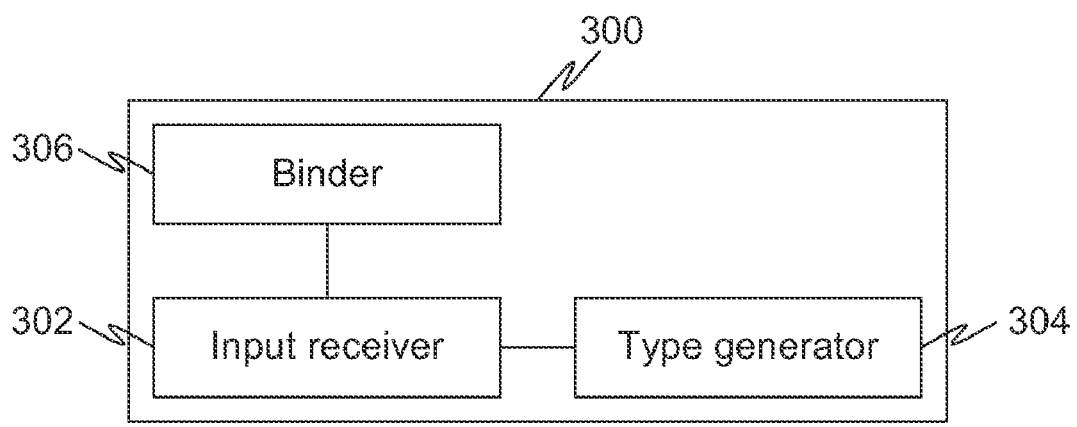
FIG. 3 is a block diagram showing a device for testing a software program, in accordance with an embodiment of the invention.

FIG. 3 is a block diagram showing components of a device 300 for testing a software program, in accordance with an embodiment. Device 300 for testing a software program includes may be a test tool, but is not limited to a test tool. Device 300 includes an input receiver 302 and a type generator 304. Input receiver 302 receives a textual input for testing the software program using the at least one static type. This has been explained in detail in conjunction with FIG. 1 and FIG. 2 above. The textual input is pre-linked to one or more static types. The textual input may be entered in a markup language. In an embodiment the markup language is Extensible Markup Language (XML) but is not limited to XML. Examples of the markup language other than XML, may include, but are not limited to, Extensible Binary Meta Language (EBML), Generalized Markup language (GML), Standard Generalized Markup Language (SGML), and (Hyper Text Markup Language) HTML. The textual input may also be entered in a text file or an excel worksheet. Thereafter, a dynamic type is created based on the textual input in a dynamically typed language by type generator 304. This has been explained in conjunction with FIG. 1.

In an embodiment, device 300 includes a binder 306. In various embodiments, the SWIG includes binder 306. Binder 306 creates an import definition of the at least one static type on the dynamically typed language. Further, the textual input received by input receiver 302 is pre-linked to the import definition by binder 306. As a result of which, the textual input can be used to invoke the at least one static type and test them. The input receiver 302, type generator 304, and/or binder 306 of device 300 can be coupled and/or connected in any of a variety of combinations as appropriate to a system that includes device 300, and are thus not limited to the configuration shown in FIG. 3.

Various embodiments provide methods and systems for testing software programs without creating adaptation layer for each type used by it. Further, the various embodiments provide methods and systems for testing 802.16 protocol software program.

What is claimed is:

1. A method to test a software program, comprising:
   creating an import definition of a static type, associated with the software program, in a language that uses a dynamic type;
   providing a reference to the static type via the import definition;
   receiving a textual input that is pre-linked to the import definition; and
   executing the software program using a created dynamic type to invoke the static type based on the reference and testing the static type.

2. The method of claim 1, wherein the invoking comprises:
   creating the dynamic type in the language based on the textual input.

3. The method of claim 2, wherein the creating the dynamic type includes populating the dynamic type with a predefined test vector.

4. The method of claim 1, wherein the testing the static type includes testing the static type without creating an adaptation layer for the static type.

5. The method of claim 1, wherein the software program is an 802.16 protocol software program.

6. The method of claim 1, wherein the language that uses the dynamic type is a scripting language.

7. The method of claim 1, wherein the receiving the textual input includes receiving the textual input via a markup language.

8. A test device to test a software program, comprising:
   a binder configured to create an import definition of a static type, associated with the software program, in a language that uses a dynamic type, the import definition providing a reference to the static type;
   a receiver configured to receive a textual input that is pre-linked to the import definition; and
   a processor configured to execute though software program by using a created dynamic type to invoke the static type based on the reference and testing the static type.

9. The test device of claim 8, further comprising:
   a creator configured to create the dynamic type in the language based on the textual input.

10. The test device of claim 9, wherein the creator is configured to populate the dynamic type with a predefined test vector.

11. The test device of claim 8, wherein the test device is configured to test the static type without creating an adaptation layer for the static type.

12. The test device of claim 8, wherein the software program is an 802.16 protocol software program.

13. The test device of claim 8, wherein the language that uses the dynamic type is a scripting language.

14. The test device of claim 8, wherein the receiver is configured to receive the textual input via a markup language.

15. A test device to test a software program, comprising:
   a receiver configured to receive a textual input for testing the software program using at least one static type used by the software program, the textual input being pre-linked to the at least one static type;

a creator configured to create a dynamic type based on the textual input in a dynamically typed language;

a processor configured to execute the software program by using the dynamic type invoking the at least one static type used by the software program; and a generator configured to create an import definition of the at least one static type used by the software program, the import definition being created in the dynamically typed language and being pre-linked to the textual input.

16. The test device of claim 15, wherein the generator is a Simplified Wrapper and Interface Generator (SWIG).

17. The test device of claim 15, wherein the software program is written in a statically typed language.

18. The test device of claim 15, wherein the software program is a protocol software program.

19. The test device of claim 15, wherein the protocol software program is an 802.16 protocol software program.

* * * * *

UNITED STATES PATENT AND TRADEMARK OFFICE
CERTIFICATE OF CORRECTION

PATENT NO. : 8,291,385 B2  
APPLICATION NO. : 12/917414  
DATED : October 16, 2012  
INVENTOR(S) : Sriram V. Iyer Page 1 of 1

It is certified that error appears in the above-identified patent and that said Letters Patent is hereby corrected as shown below:

Title Page
Item (73), please replace "Irvine" with --Irvine, CA (US)--.

In the Specification
Column 4
Line 45, Claim 8, please replace "though" with --the--.

Signed and Sealed this  
Twenty-third Day of July, 2013

Teresa Stanek Rea  
*Acting Director of the United States Patent and Trademark Office*